US007011599B2

(12) United States Patent
Becquerelle et al.

(10) Patent No.: US 7,011,599 B2
(45) Date of Patent: Mar. 14, 2006

(54) FLEXIBLE CONNECTION SYSTEM BETWEEN A PLANET CARRIER AND THE STATIONARY SUPPORT IN A SPEED REDUCTION GEAR TRAIN

(75) Inventors: Samuel Becquerelle, Voisins le Bretonneux (FR); Daniel Ville, Meudon la Foret (FR); Joël Libolt, Mulhouse (FR); Olivier Moog, Mulhouse (FR); Serge Pettinotti, Courbevoie (FR); Benjamin Peiron, Pibrac (FR)

(73) Assignee: Hispano-Suiza, Colombes (FR)

( * ) Notice: Subject to any disclaimer, the term of this patent is extended or adjusted under 35 U.S.C. 154(b) by 166 days.

(21) Appl. No.: 10/816,874

(22) Filed: Apr. 5, 2004

(65) Prior Publication Data

US 2004/0259679 A1    Dec. 23, 2004

(30) Foreign Application Priority Data

Apr. 4, 2003  (FR)  ................................. 03 04186

(51) Int. Cl.
*F16H 57/08*  (2006.01)
(52) U.S. Cl. ...................... 475/331; 475/337; 403/221; 403/224

(58) Field of Classification Search ................ 475/331, 475/337, 348; 464/89, 70; 403/149, 150, 403/221, 223, 224, 228
See application file for complete search history.

(56) References Cited

U.S. PATENT DOCUMENTS 5,391,125 A * 2/1995 Turra et al. .................. 475/346
5,466,198 A * 11/1995 McKibbin et al. .......... 475/346

FOREIGN PATENT DOCUMENTS

FR  1 379 451  11/1964

* cited by examiner

*Primary Examiner*—Rodney H. Bonck
*Assistant Examiner*—Tara Bolton
(74) *Attorney, Agent, or Firm*—Oblon, Spivak, McClelland, Maier & Neustadt, P.C.

(57) ABSTRACT

A speed reduction gear train comprising a sun gear, an annular gear, and planet gears meshing with the sun gear and the annular gear and mounted in a cage having axial housings between pairs of adjacent planet gears. The cage is connected to a cage carrier having axial arms received in the housings by radial pins disposed in the midplane of the cage by means of spherical finger connections allowing the cage carrier to tilt and to move axially relative to the cage.

8 Claims, 9 Drawing Sheets

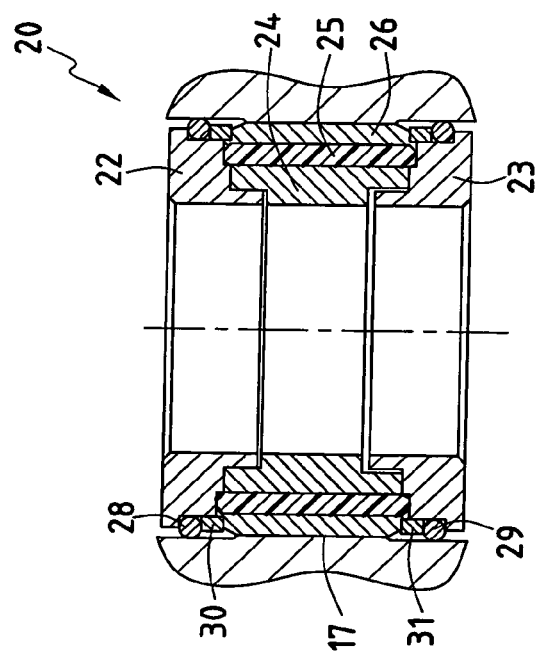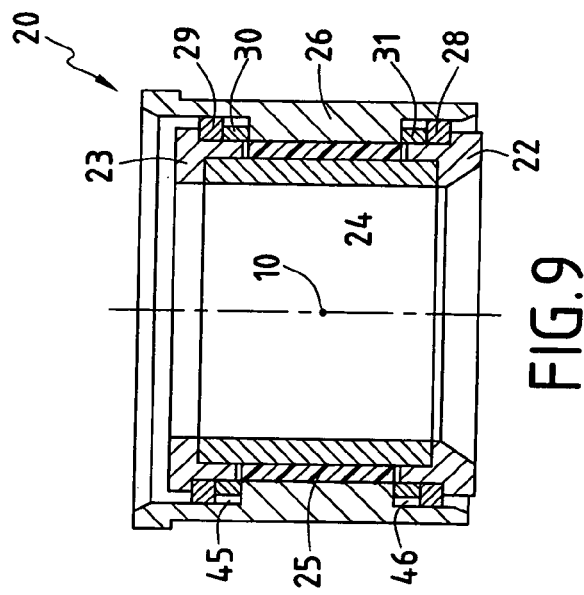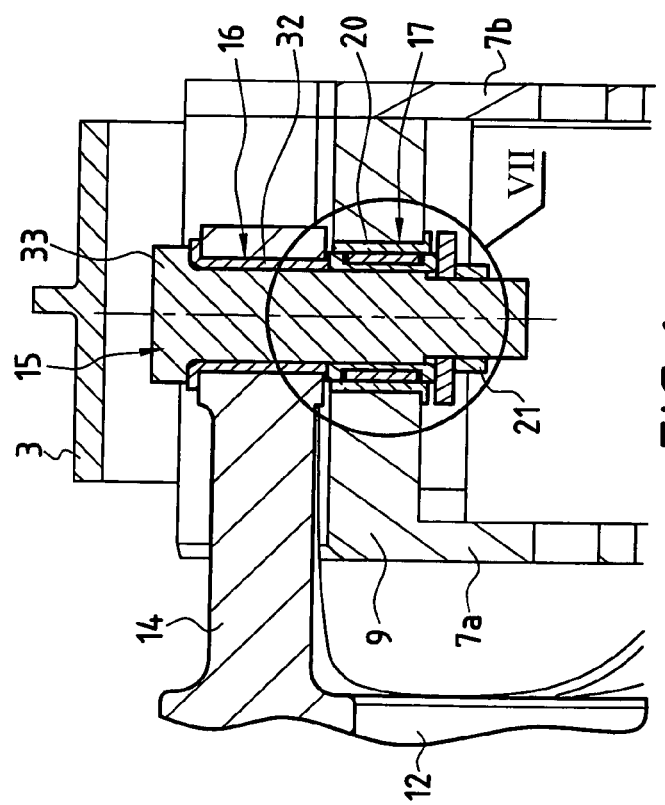

FLEXIBLE CONNECTION SYSTEM BETWEEN A PLANET CARRIER AND THE STATIONARY SUPPORT IN A SPEED REDUCTION GEAR TRAIN

The invention relates to a speed reduction gear train, in particular for use in transmitting torque from a gas turbine to a compressor in a turbomachine.

BACKGROUND OF THE INVENTION

A reduction gear train is constituted mainly by four elements: a sun gear driven by the turbine shaft, an annular gear that is coaxial about the sun gear, planet gears meshing with the sun gear and with the annular gear, and a planet carrier.

The reduction ratio in such an assembly is varied by modifying the number of teeth of each of the gears, and by the architecture of the reduction gear train.

There exist two types of configuration:
  planetary reduction gear trains in which the planet carrier is stationary and the annular ring is free to rotate; the optimum operating range for this type of reduction gear train corresponds to a reduction ratio lying in the range 1 to 3; and
  epicyclic reduction gear trains in which the annular ring is stationary and the planet carrier is free to rotate; the optimum operating range for this type of reduction gear train corresponds to a reduction ratio of 3 or more.

When the reduction gear train is used for transmitting torque from the gas turbine to a compressor in a turbomachine, the moving element of the reduction gear train, i.e. the annular gear or the planet carrier, is connected to the drive shaft of the compressor, while the other element is connected to the stationary structure of the turbomachine.

Which configuration is selected for a reduction gear train thus depends on the desired reduction ratio. The major drawback of the epicyclic configuration is that in spite of being more compact than a planetary reduction gear train, the planet gears are subjected to a centrifugal acceleration field of the order of 2000 g (where g is the acceleration due to gravity) leading to major difficulties at the bearings for supporting the planet gears.

For a reduction gear train, when considering a planet gear in isolation, it can be seen that the bearing which supports the planet gear is subjected to a radial force equivalent to twice the tangential force generated by meshing. In addition, in an epicyclic reduction gear train, large centrifugal forces are also present.

Since the planet carrier is generally connected to a stationary structure with a planet reduction gear train, or to a transmission shaft with an epicyclic reduction gear train, via one of its front faces, the bearings supporting the planet gears, and more generally the planet carrier, are subjected to twisting torque and will deform, transmitting stresses and deformation to the elements to which the planet carrier is fixed. Such deformation also leads to the gears coming out of alignment and to premature wear of the reduction gear train.

In order to minimize deformation in operation of the planet carrier in an epicyclic reduction gear train, U.S. Pat. No. 5,391,125, which represents the state of the art closest to the invention, proposes a speed reduction gear train for transmitting torque between a gas turbine and a compressor in an aviation turbomachine, which gear comprises a sun gear coaxial with the axis of the reduction gear train and connected to the turbine, a planet carrier connected to the compressor coaxially with the sun gear and having a plurality of planets mounted thereon which mesh with the sun gear, and an annular gear fixed to a structure of the turbomachine and with which the planet gears mesh. In that epicyclic reduction gear train, the planet carrier comprises firstly an annular cage having a plurality of seats for supporting bearings parallel to the axis of the reduction gear train and each having one of the planet gears turning thereon, and a plurality of axial housings, each disposed between two adjacent planet gears, and secondly an annular cage carrier connected to the compressor and having a plurality of axial arms, each arm being disposed in one of the housings of the cage and being fixed to an adjacent portion of the cage by a pin placed in the radial midplane of the cage, Each pin disposed perpendicularly to the axis of the reduction gear train is inserted in a hole formed in the corresponding arm and in two holes formed radially on either side of the arm in an axial wall of the cage, with shells being interposed therebetween. Such a plug-and-socket type connection does not allow any tilting or axial displacement between the cage and the cage carrier, as can occur in a turbomachine, in particular an aviation turbomachine, in the event of vibration due to turbulence in the ambient air or to thermal expansion.

SUMMARY OF THE INVENTION

The reduction gear train of the invention differs from that state of the art by the fact that the housings of the arms are disposed radially at the intersections between the lines of the forces to which adjacent planet gears are subjected, and by the fact that each pin for fixing an arm to the adjacent portion of the cage is rigidly secured to one of the parts constituted by said arm and said cage portion, and is mounted to the other one of said parts by a spherical finger type connection which is radially rigid relative to the axis of the reduction gear train and flexible in tilting and in axial displacement, the connection between the pin and the other part being provided by a sleeve surrounding the pin and disposed in an orifice of the other part, said sleeve comprising two axial end plates and a plurality of coaxial bushings disposed between said end plates, at least one of said bushings being made of an elastomer.

This disposition makes it possible to provide flexibility in the connections between the sun gear and the planet gears and between the planet gears and the annular gear. This presents the non-negligible advantage of reducing misalignment in contact between sets of teeth.

Where necessary, the elastomer bushing allows for the cage to tilt relative to the cage carrier connected to the first element.

Preferably, the end annular plates of the sleeve present respective facing radially-inner and radially-outer rabbets, said rabbets themselves being separated by a respective annular rib, and the bushings comprise a rigid inner ring whose ends are received in the radially-inner rabbets of the plates, a rigid outer ring which extends between the radially outer rabbets of the plates, and which presents, at its ends, radially-inner grooves facing the radially-outer rabbets of the plates, and the elastomer bushing is interposed between the inner ring and the outer ring and extends between the ribs of the plates.

The annular chambers are defined by the radially-outer rabbets of the plates and the radially-inner grooves of the outer ring, said chambers containing resilient gaskets.

Each of said annular chambers further contains an anti-extrusion ring for preventing the elastomer from being extruded, each of said anti-extrusion rings being interposed between a resilient gasket and the front face of the radially-inner groove of the outer ring.

In order to hold the sleeve on the pin, one of the plates of the sleeve presses against the part to which the pin is fixed, and the other plate is pressed against the inner ring by a nut co-operating with a thread on the pin.

In a first embodiment, the pin is rigidly connected to the arm and is disposed perpendicularly to the axis of the reduction gear train.

In a second embodiment, the pin is formed at the end of the arm and is parallel to the axis of the reduction gear train.

BRIEF DESCRIPTION OF THE DRAWINGS

Other advantages and characteristics of the invention will appear on reading the following description made by way of example and with reference to the accompanying drawings, in which:

FIG. 6 is a section view of the connection between a arm and the cage;

FIG. 7 is a section view of the sleeve shown in FIG. 6;

FIG. 9 is a section of the FIG. 8 sleeve;

MORE DETAILED DESCRIPTION

Figure 1:
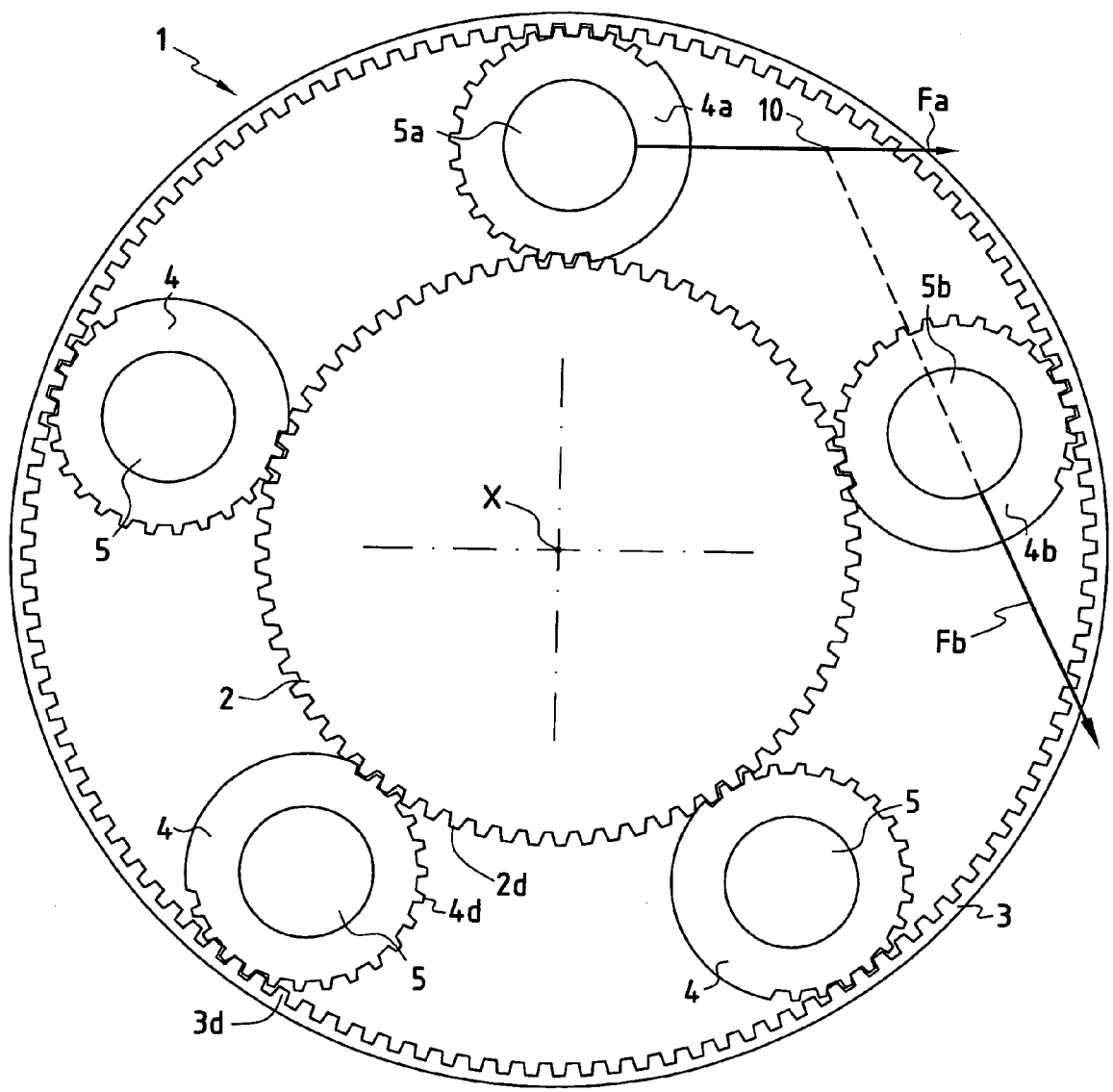
FIG. 1 is an axial view of a speed reduction gear train showing the tangential forces generated by the meshing of the planet wheels, and the resultant thereof on the planet wheel bearings.
Figure 2:
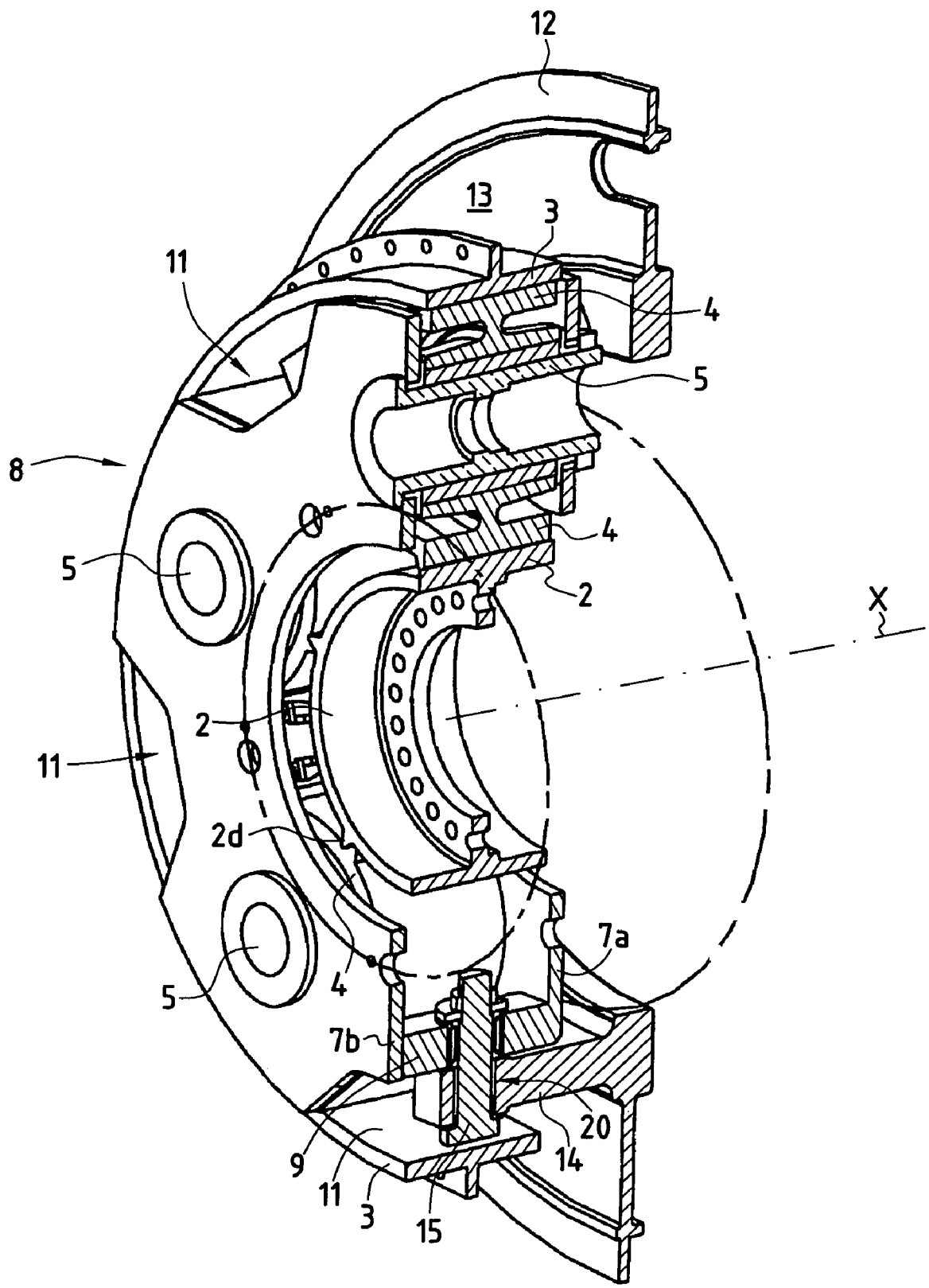
FIG. 2 is a perspective view of half a reduction gear train of the invention shown in section on a plane containing its axis.
Figure 3:
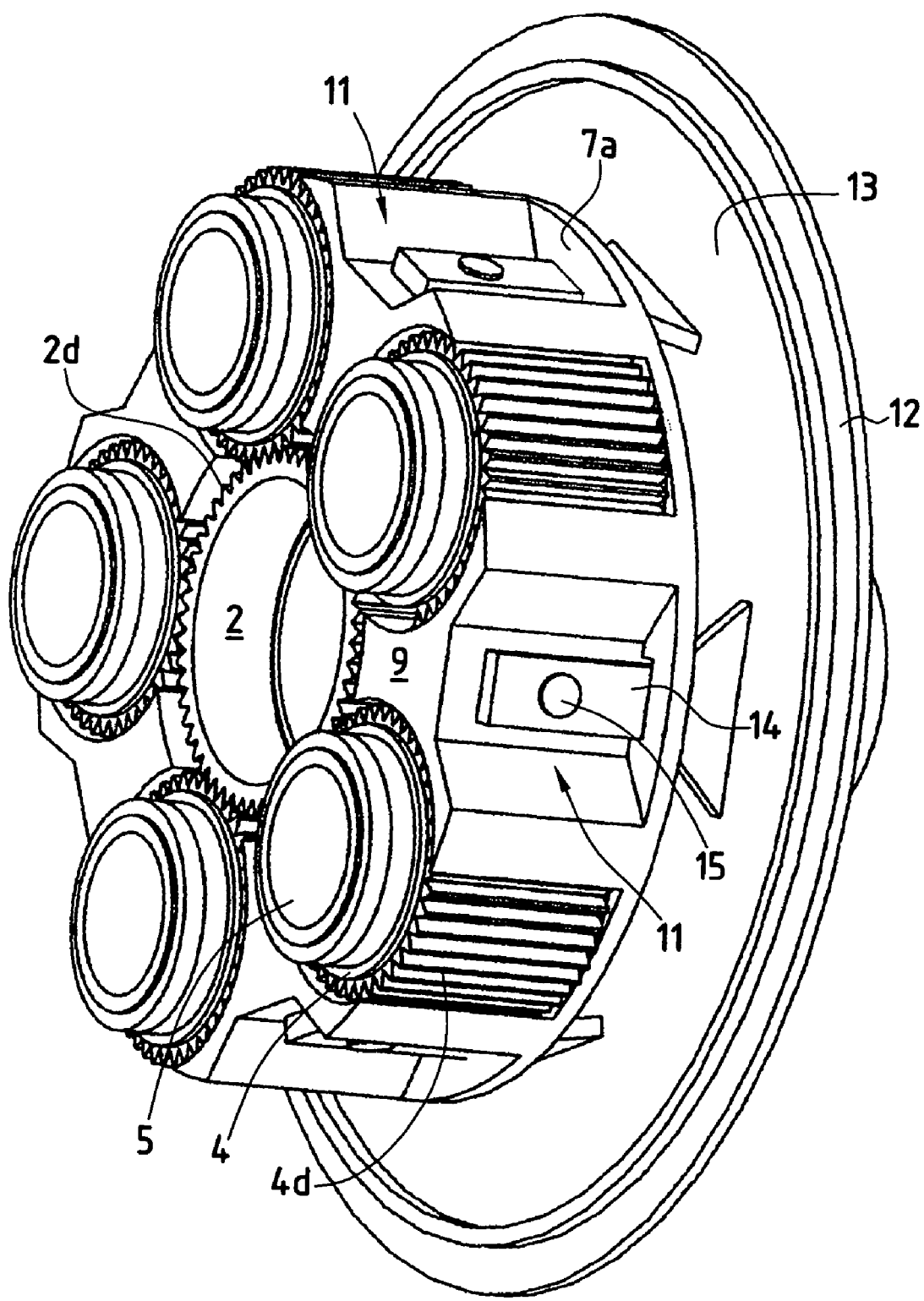
FIG. 3 is a perspective view without the annular gear and without the side plate that acts as an axial abutment for the planet bearings of a reduction gear train of the invention.
Figure 4:
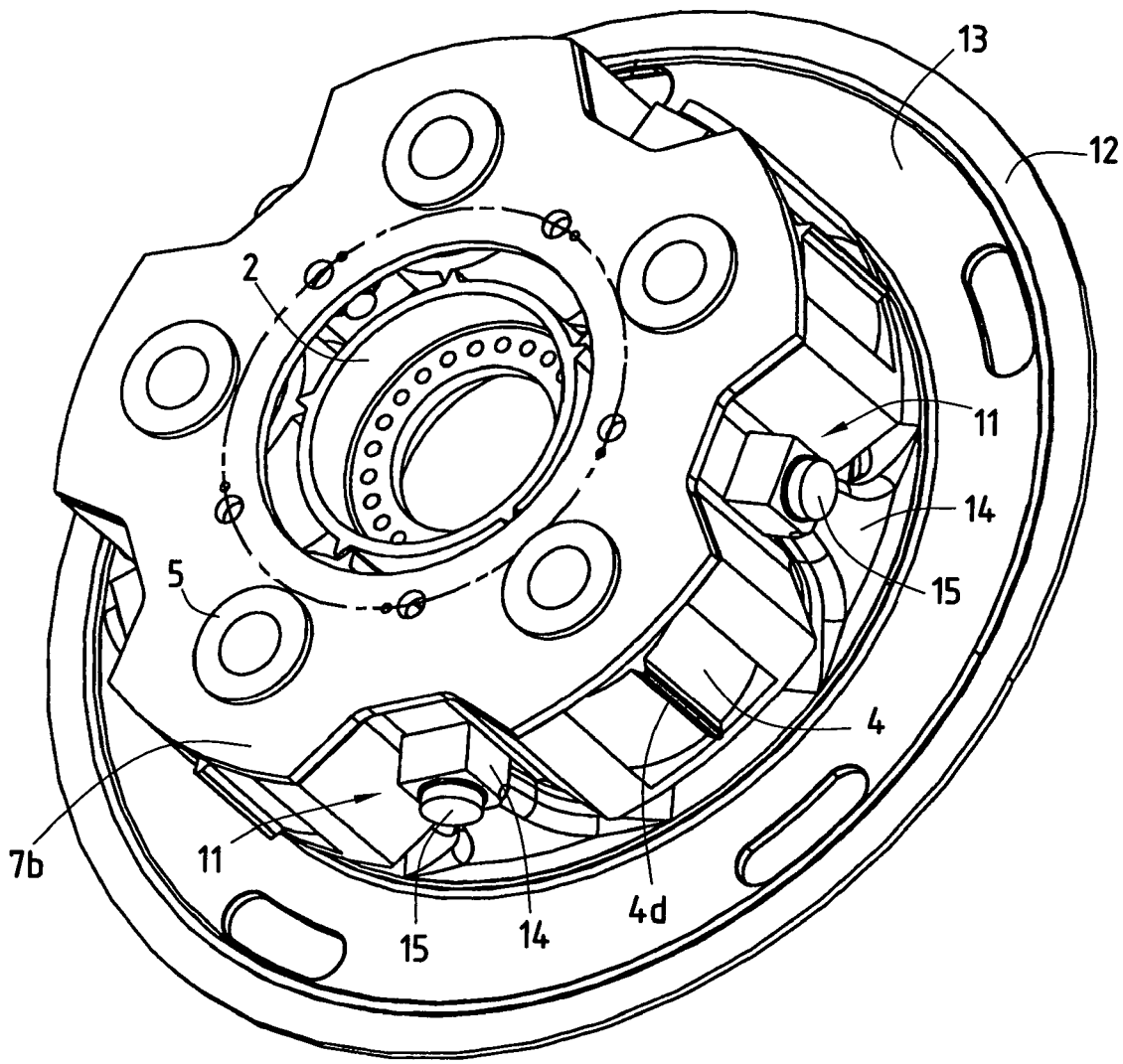
FIG. 4 is a perspective view of a planet carrier of the invention.

FIGS. 1 and 2 show a speed reduction gear train 1 of axis X comprising a sun gear 2 of axis X presenting at its periphery a set of teeth 2d, an annular gear 3 of axis X having a diameter greater than the diameter of the sun gear 2 and presenting on its radially-inner wall a set of teeth 3d, and between the sun gear 2 and the annular gear 3, a plurality of planet gears 4, there being five of them shown in FIG. 1, presenting at their peripheries respective sets of teeth 4d meshing with the sets of teeth 2d and 3d of the sun gear 2 and of the annular gear 3. The planet gears 4 are mounted to turn on bearings 5 parallel to the axis X with ends mounted in pairs of seats provided facing one another in two side plates 7a and 7b of a cage 8 supporting the planet gears 4, the two side plates 7a and 7b being rigidly interconnected by bridges 9 disposed between pairs of adjacent planet gears.

Preferably, the bridges 9 and one of the side plates 7a are made as a single piece, constituting the support casing for the bearings 5 and the planet gears 4, while the other side plate 7b is in the form of a cover serving as an axial abutment for all of the bearings 5 of the planet gears 4. The bearings 5, of which there are five in the drawings, are regularly spaced apart around the axis X of the reduction gear train 1 and they are disposed halfway between the sets of teeth 2d and 3d.

Regardless of whether configured as a planet reduction gear train in which the cage 8 is prevented from rotating about the axis X while the annular gear 3 moves in rotation, or as an epicyclic gear in which the annular gear 3 is fixed to a stationary structure while the cage 8 rotates about the axis X, each bearing 5 is subjected to a force that is perpendicular to the plane containing the axis X and the axis of said bearing, and of magnitude that is equivalent to twice the tangential force generated by meshing.

In FIG. 1, arrow Fa represents the force withstood by the bearing 5a of planet gear 4a, and arrow Fb represents the force withstood by bearing 5b of planet gear 4b adjacent to planet gear 4a. These two forces Fa and Fb intersect at a point 10 situated within the diameter of the annular gear 3, and in the radial midplane of the cage 8.

In accordance with the present invention, the bridges 9 and at least one of the side plates 7a and 7b present axial housings 11, each containing a point of intersection 10 between the force lines Fa and Fb of two adjacent planet gears 4a, 4b.

Reference 12 designates an annular cage carrier which can be seen in FIG. 2, of axis X, and having on its front face 13 a plurality of arms 14, there being five in the example shown in the drawings, extending parallel to the axis X and each occupying one of the axial housings 11.

Each arm 14 is fixed to the adjacent bridge 9 by a pin 15 of axis perpendicular to the axis X of the reduction gear train 1 and intersecting it. The pin 15 is rigidly secured to the arm 14 and is connected to the adjacent bridge 9 by a spherical connection of the finger type which prevents the cage carrier 12 from moving radially, but which allows the cage carrier 12 to tilt to some extent or to move axially a little relative to the cage 8 so as to provide flexibility in the connections between the sun gear 8 and the planet gears 4, and between the planet gears 4 and the annular gear 3. This provides the non-negligible advantage of reducing misalignment in the contacts between the sets of teeth 2d, 4d, and 3d.

The axes of the pins 15 lie in radial midplanes between the planet gears 4 and pass through the points of intersection 10 between the forces Fa and Fb acting on two adjacent bearings 5a, 5b.

Figure 5:
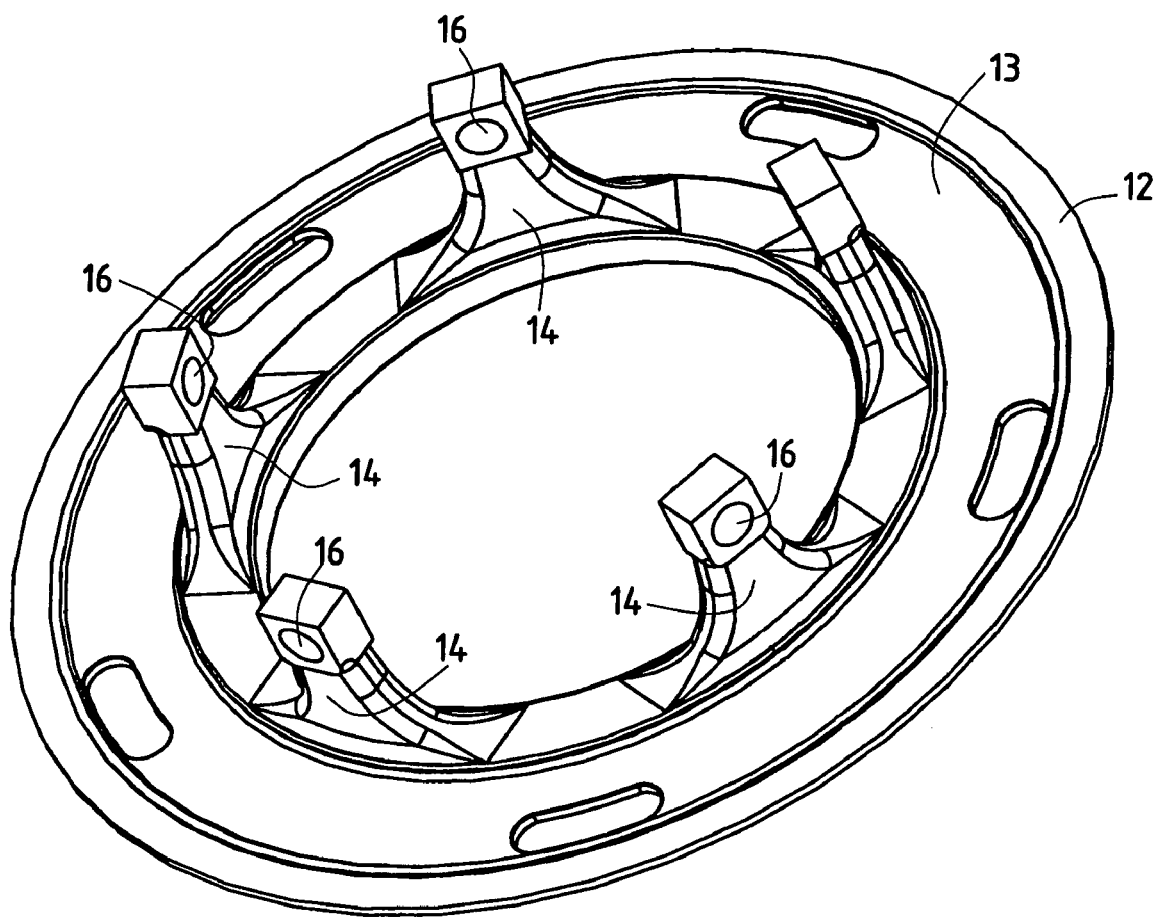
FIG. 5 is a perspective view of the cage carrier on its own.

FIG. 5 is a perspective view of the cage carrier 12 on its own. In this figure, it can be seen that the arms 14 are of substantially rectangular section, each having at its end a radial hole 16 for receiving the radially-outer portion of a pin 15.

In register with the radial hole 16, the corresponding bridge 9 has a radial orifice 17 in which there is placed a sleeve 20 surrounding the radially-inner portion of the pin 15, as shown in FIG. 6, this sleeve 20 being held on the pin 15 by a nut 21 which co-operates with a thread provided on the radially-inner end of the pin 15.

The sleeve 20 which is shown in detail in FIG. 7 comprises two end annular plates referenced 22 and 23, and at least three coaxial bushings 24, 25, and 26, interposed between the annular plates 22 and 23, with the intermediate bushing 25 being made of an elastomer material. The radially-innermost bushing 24 and the annular plates 22 and 23 are of inside diameter equal to the outside diameter of the pin 15, and the ends of the inner bushing 24 are disposed in rabbets facing each other in the annular plates 22 and 23. The elastomer bushing 25 is placed between the inner bushing 24 and the outer bushing 26 and between the annular endplates 22 and 23. The radially-outer bushing 26 has an outside diameter equal to the diameter of the orifice 17 in the bridge 9. This outer bushing 26 is crimped in the orifice 17 and it holds the elastomer bushing 25 captive. Resilient gaskets 28 and 29 are interposed between the annular plates 22 and 23 and the radially-inner wall of the orifice 17 or the ends of the radially-outer bushing 26 in order to enable the outer bushing 26 to tilt or move laterally relative to the inner bushing 24 by deforming the elastomer bushing 25.

Anti-extrusion rings referenced 30 and 31 are interposed between the resilient gaskets 28 and 29 and a respective end surface of the outer bushing 26.

The inner and outer bushings 24 and 26 are made in the form of rigid metal rings. The anti-extrusion rings 30 and 31 enable the material constituting the elastomer bushing 25 to be kept inside the annular space that is provided to receive it.

The radially-outer portion of the pin 15 is crimped in the hole 16 of the arm 14 with an interposed shell 32 that can be seen in FIG. 6. This radially-outer portion has an enlarged head 33. When the nut 21 is tightened against the annular plate 23, it presses the inner bushing 24 against the annular plate 22 which in turn presses against the face of the arm 14 that is the radially inner face relative to the axis X. The sleeve 20 is thus held in a radially-fixed position relative to the axis X of the reduction gear train 1.

Figure 8:
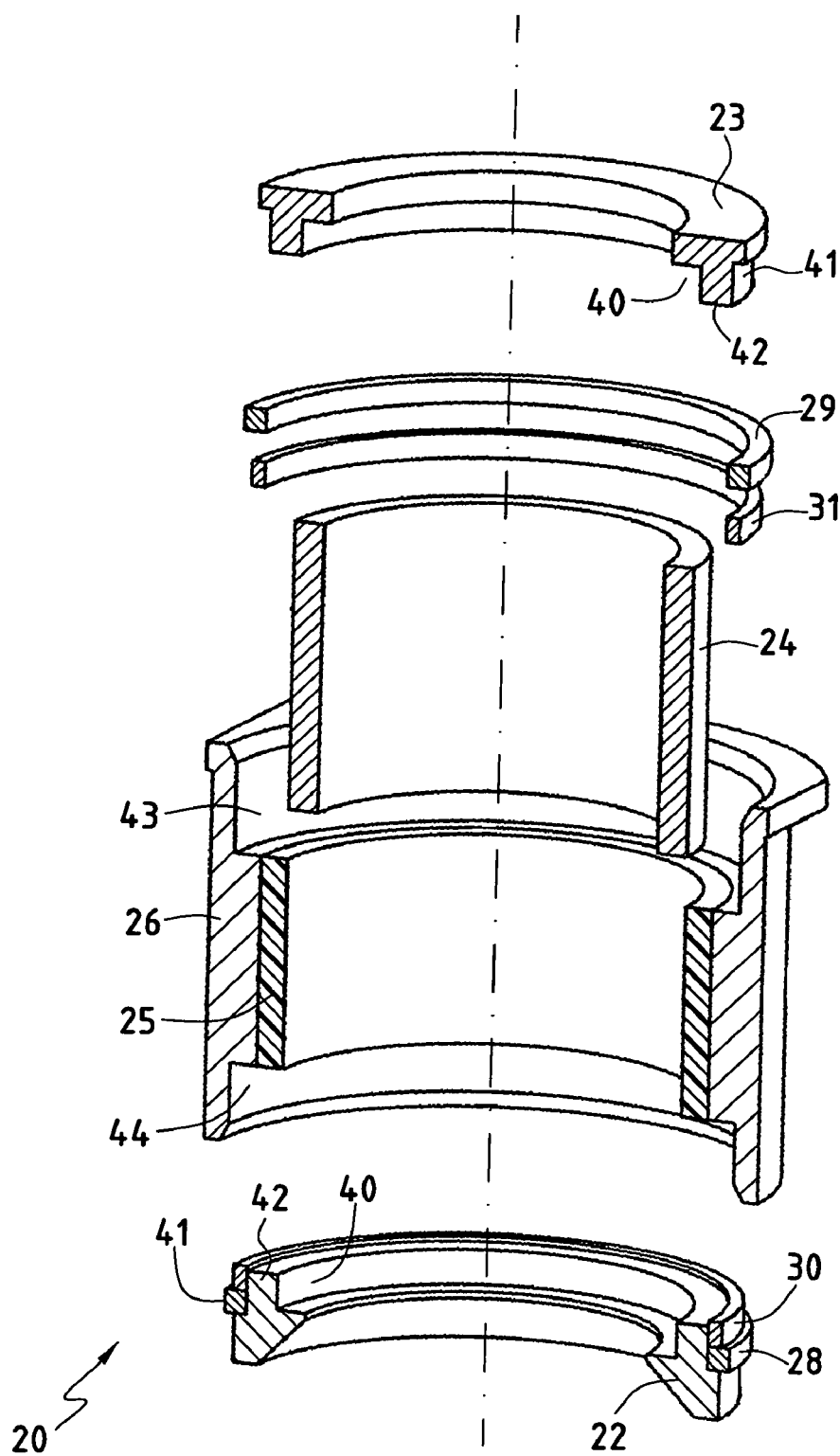
FIG. 8 is an exploded view of a preferred embodiment of the sleeve shown in section on a plane containing the axis of the sleeve.

FIGS. 8 and 9 show a preferred embodiment of the sleeve 20 which differs from the sleeve 20 shown in FIG. 7 by the fact that the end annular plates 22 and 23 present respective radially-inner and radially-outer rabbets 40 and 41 facing one another in pairs and separated by respective annular ribs 42.

The outside diameter of the radially-inner rabbet 40 is equal to the outside diameter of the inner ring or bushing 24. The ends of the inner ring 24 are disposed in the radially-inner rabbet 40, after assembly.

The elastomer bushing 25 of height smaller than the height of the inner ring is disposed between the annular ribs 42 of the annular plates 22 and 23.

The outer ring or bushing 26 of height greater than the inner ring 24 presents radially-inner grooves at its ends, referenced 43 and 44, separated by a ring height that is substantially equal to the height of the elastomer bushing 25.

The radially-inner grooves 43 and 44 of the outer ring are located, after assembly, facing the radially-outer rabbets 41 of the end annular plates 22 and 23 and co-operate therewith to define annular chambers referenced 45 and 46 that can be seen in FIG. 9, each chamber housing a sealing gasket 28, 29 and an anti-extrusion ring 30, 31.

The diameters of the radially-inner grooves 43 and 44 are slightly greater than the outside diameter of the annular plates 22 and 23, and the ends of the outer ring 26 surround the annular plates 22 and 23 with clearance so as to allow the elastomer bushing 25 to deform and enable the inner and outer rings 24 and 26 to come out of alignment.

The point of intersection 10 between the forces withstood by the bearings 5a, 5b of two adjacent planet gears 4a, 4b is preferably situated in the central zone of the sleeve 20. The force withstood by the pin 15 and the sleeve 20 is thus a radial force perpendicular to the axis of the pin 15, which therefore does not lead to torque being applied to the spherical finger connection. The inner ring 24 is crimped on the pin 15 and the outer ring 26 is crimped on the bridge 9.

In the example described in detail above, the pin 15 is crimped on the arm 14 and the spherical finger connection is disposed between the pin 15 and the bridge 9. It is obvious for the person skilled in the art that the pin 15 could be crimped to the bridge 9 and the spherical finger connection would then be disposed between the pin 15 and the arm 14.

Figure 10:
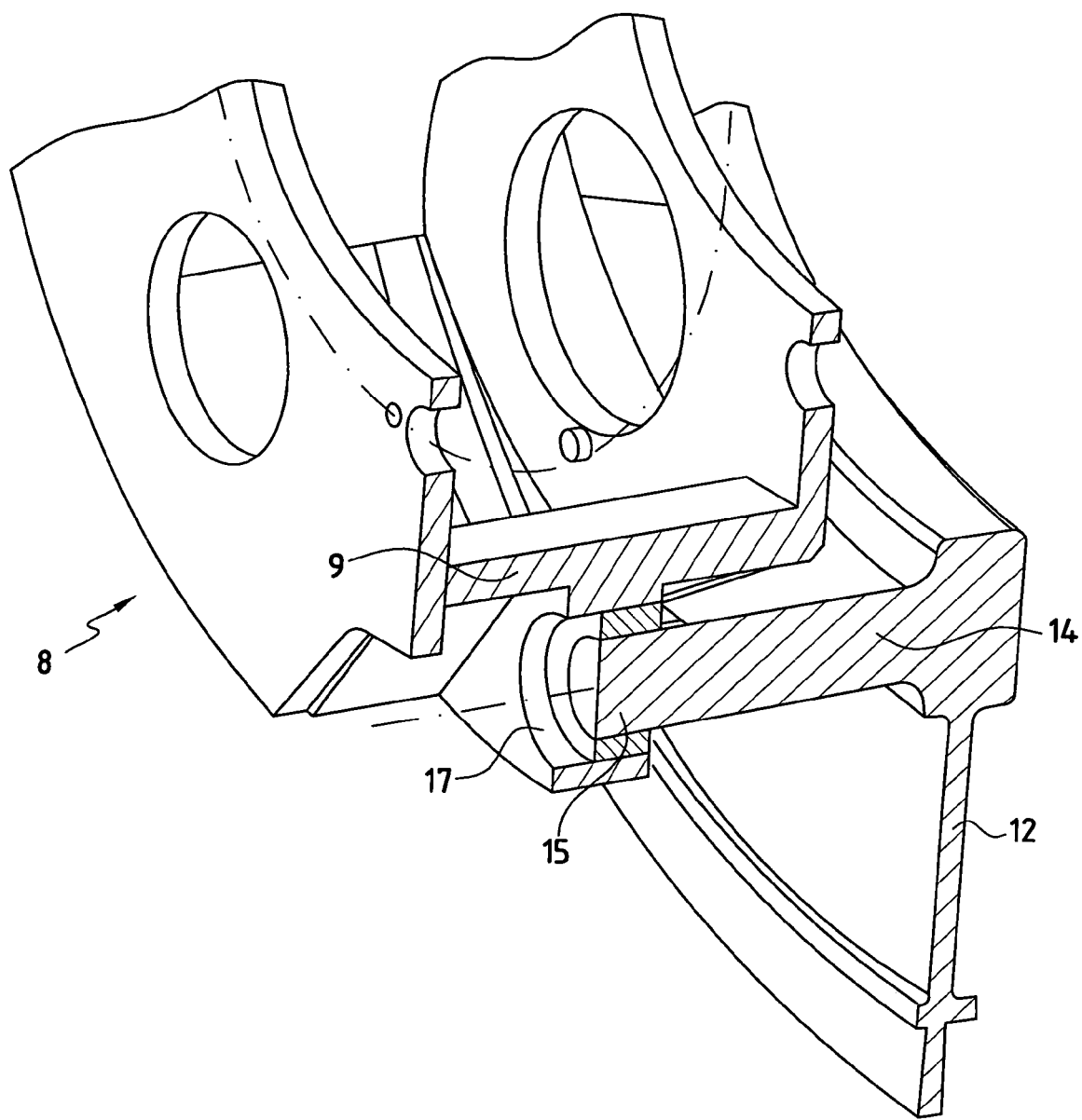
FIG. 10 is a perspective view showing a variant embodiment of the connection between the cage and the cage carrier.
Figure 11:
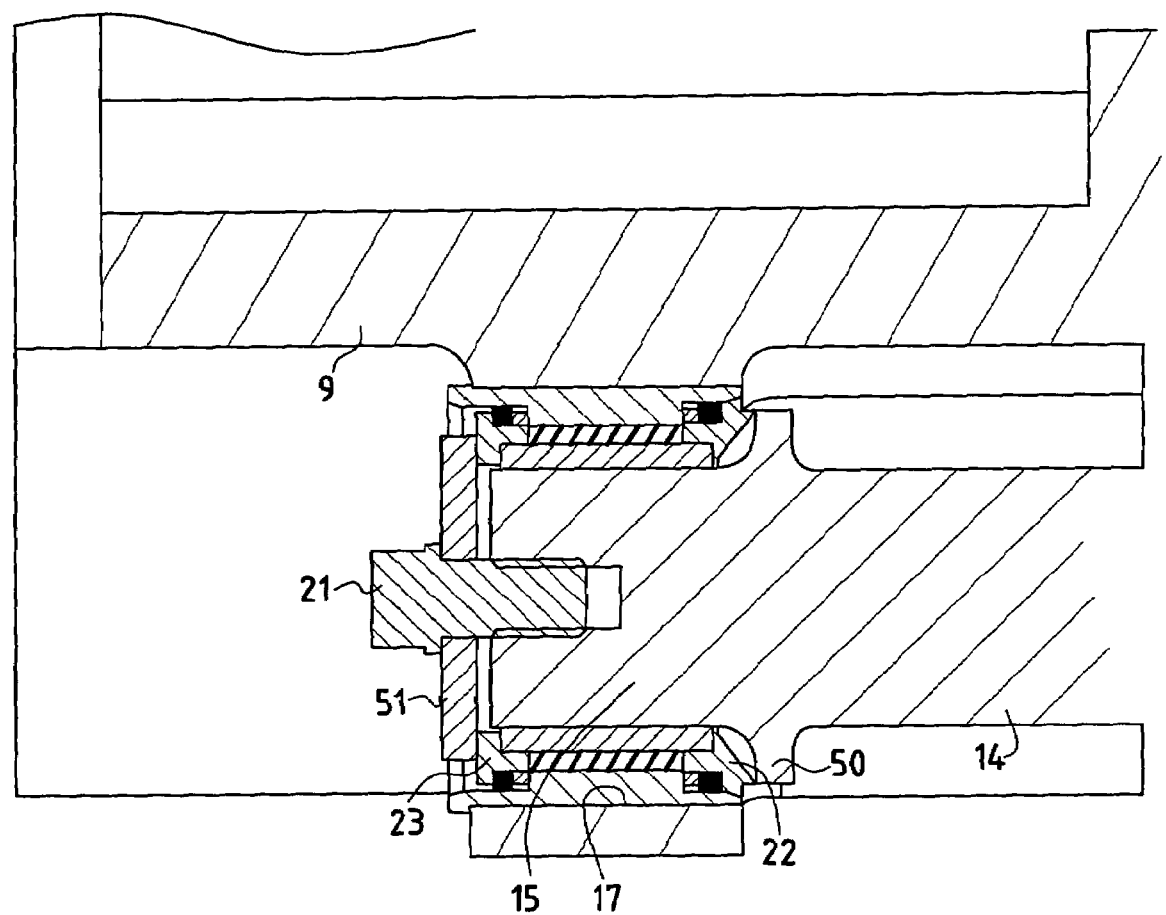
FIG. 11 is a section of the connection shown in FIG. 10.

FIGS. 10 and 11 show a variant embodiment of the invention which differs from that described above by the fact that the pin 15 is formed at the end of the arm 14 and is parallel to the axis X of the reduction gear train 1. The corresponding bridge 9 has an orifice 17 placed in the midplane of the cage 8, with a sleeve 20 of the kind described above with reference to FIG. 9 being placed therein. The sleeve 20 surrounds the pin 15, and the annular plate 22 presses against an annular shoulder 50 formed on the arm 14. The sleeve 20 is retained on the pin 15 by a nut 21 pressing against a washer 51, itself pressing against the annular plate 23.

This solution presents the advantage of being small in size and presenting lower manufacturing costs. The sleeve 20 is inserted parallel to the axis X on the end of the pin 15.

The above-described reduction gear train 1 is particularly applicable to driving a compressor by means of a turbine in an aviation turbomachine. In which case, the sun gear 2 is connected to the turbine shaft.

The cage carrier 12 is then connected to the stationary structure of the turbomachine and the annular gear 3 is connected to the compressor drive shaft when the gear train is configured as a planetary reduction gear train.

In contrast, when the cage carrier 12 is connected to the drive shaft of the compressor when the gear train is configured as an epicyclic reduction gear train, in which case the gear 3 is connected to the stationary structure of the turbomachine.

What is claimed is:

1. A speed reduction gear train, for transmission between a gas turbine and a compressor in a turbomachine, said reduction gear train comprising a sun gear coaxial with an axis of said reduction gear train and connected to said turbine, a planet carrier connected to a first element of said turbomachine coaxially with said sun gear and on which there are mounted a plurality of planet gears meshing with said sun gear, and an annular gear fixed to a second element of said turbomachine and with which said planet gears mesh, one of said first and second elements being a fixed structure of said turbomachine and the other of said elements driving said compressor in rotation, said planet carrier comprising firstly an annular cage having a plurality of pairs of seats for supporting bearings parallel to the axis of said reduction gear train and each bearing having one of said planet gears turning thereon, and a plurality of axial housings, each housing disposed between two adjacent planet gears, and secondly an annular cage carrier connected to said first element and having a plurality of axial arms, each arm being disposed in one of said housings and being fixed to an adjacent portion of said cage by a pin disposed substantially in the radial midplane of said cage, wherein the housings of the arms are disposed radially at the intersections between the lines of the forces to which adjacent planet gears are subjected, and wherein each pin for fixing an arm to the adjacent portion of the cage is rigidly secured to one of the parts constituted by said arm and said cage portion, and is mounted to the other one of said parts by a spherical finger type connection which is radially rigid relative to the axis of the reduction gear train and flexible in tilting and in axial displacement, the connection between the pin and the other part being provided by a sleeve surrounding the pin and disposed in an orifice of the other part, said sleeve comprising two axial end plates and a plurality of coaxial bushings disposed between said end plates, at least one of said bushings being made of an elastomer.

2. A reduction gear train according to claim 1, wherein the axial end plates of the sleeve present respective facing radially-inner and radially-outer rabbets, said rabbets themselves being separated by a respective annular rib, and wherein the bushings comprise a rigid inner ring whose ends are received in the radially-inner rabbets of the plates, a rigid outer ring which extends between the radially outer rabbets of the plates, and which presents, at its ends, radially-inner grooves facing the radially-outer rabbets of the plates, and the elastomer bushing is interposed between the inner ring and the outer ring and extends between the ribs of the plates.

3. A reduction gear train according to claim 2, wherein annular chambers are defined by the radially-outer rabbets of the plates and the radially-inner grooves of the outer ring, said chambers containing resilient gaskets.

4. A reduction gear train according to claim 3, wherein each of said annular chambers further contains an anti-extrusion ring for preventing the elastomer from being extruded, each of said anti-extrusion rings being interposed between a resilient gasket and front faces of the radially-inner grooves of the outer ring.

5. A reduction gear train according to claim 2, wherein one of the plates of the sleeve presses against the part to which the pin is fixed, and the other plate is pressed against the inner ring by a nut co-operating with a thread on the pin.

6. A reduction gear train according to claim 1, wherein the pin is rigidly connected to the arm and is disposed perpendicularly to the axis of the reduction gear train.

7. A reduction gear train according to claim 1, wherein the pin is formed at the end of the arm and is parallel to the axis of the reduction gear train.

8. A reduction gear train according to claim 1, wherein the annular gear is fixed to the fixed structure of the turbomachine, and the cage carrier drives the compressor in rotation.

* * * * *